Inventor
H. KANEKO
By R. Morris
Attorney

Inventor
H. KANEKO
By [signature]
Attorney

United States Patent Office 3,336,590

Patented Aug. 15, 1967

3,336,590

SIGNAL COMPARATOR

Hisashi Kaneko, Minato-ku, Tokyo, Japan, assignor to Nippon Electric Company, Limited, Tokyo, Japan, a corporation of Japan Filed Apr. 1, 1964, Ser. No. 356,385
Claims priority, application Japan, Apr. 12, 1963, 38/18,974
3 Claims. (Cl. 340—347)

This invention relates to an electrical signal comparator for discriminating whether a given electrical signal is larger or smaller than a predetermined electrical quantity, such as voltage or current, to produce a code output or an electrical quantity representative of the result of the discrimination. Thus this invention relates to an analogue-digital converter, a binary code regenerator, and other binary discriminators in general, and a voice zero crossing wave converter. This invention may therefore be applied to an electronic computer and a pulse-code-modulation (PCM) and other digital communication apparatus and particularly to the receiver and the repeater in such an apparatus.

Prior art comparators use a monostable or a bistable circuit which suddenly changes its electrical state when the magnitude or the electrical quantity of the given (or input) signal reaches the predetermined reference value. Such prior art devices includes a Schmitt circuit, a multivibrator, a blocking oscillator, a multiplier circuit, and others as indicated in Chapter 15 of the book "Pulse and Digital Circuit" written by J. Millman and H. Taub and published by McGraw Hill (1956). In prior art comparators which include active circuit elements such as vacuum tubes, transistors, diodes, or other semiconductor devices, variations in the ambient temperature, aging which change in the characteristics of the elements, fluctuation of the supply voltages, etc. cause variation or drift of the working point of the comparator or the reference electrical quantity predetermined for discrimination or comparison. Consequently unpredictable systematic errors are introduced into the code output obtained as a result of comparison.

An object of the invention is therefore to provide a comparator wherein use is so made of the stochastic property of the remainder left after subtraction of the direct-current component, if any, from the input signal so that any error introduced by the drift into the code output may completely be removed.

Another object of the invention is to provide a stable analogue-digital converter, a pulse code modulator, or binary discriminator.

Still another object of the invention is to provide a speech-to-zero crossing-wave converter in which highly amplified speech signals are not required.

This invention is based on the observation that the drift component or the variation caused by the drift in the working point of a comparator varies very slowly with time as compared with the variation with time of the input signal. It has been found that the drift component can be substantially removed by detecting the effect produced by the drift in the code output (either from the code output or from a combination of the input signal and the code output according to the stochastic property of the input signal) and by feeding back the detected (and amplified) signal to the input side of the comparator. Therefore, the invention resides in general in a comparator comprising a feedback circuit which in turn comprises a detecting circuit for deriving such a detected output and an amplifier for amplifying the detected output to provide a feedback signal having the required polarity and amplitude.

In general, it is possible instead of comparing the input signal with a working point, to compare the difference derived by subtracting the electrical quantity representative of the working point from the input signal having a working point whose electrical quantity is zero. Therefore, generality is not lost even if the electrical quantity of the working point of the comparator may be assumed to be zero. Also, it is possible instead of supplying an input signal containing the direct current component, to supply the comparator with a difference signal derived by subtracting the direct-current component from the input signal. Here too, generality is not lost, even if the input signal is presumed to have no direct-current component. Furthermore, it is possible to transfrom the code output signal into either of a pair of voltages having the same absolute value but opposite polarities regardless of whether the coded output signal is one of said pair of signals. Therefore, here too generality is not lost, even if it is alleged that the code output signal is one or the other of such a pair of voltages.

In a workable comparator in accordance with the invention, it is sufficient in a first case (in which the positive portion of the probability distribution of the magnitude of the input signal is symmetric with respect to the negative portion) to provide a detecting circuit which is a low pass filter that is supplied with the code output itself. In a second case (in which the probability distribution is not symmetric but the mean magnitude of the input signal is zero) the detecting circuit may be composed of: a circuit which is responsive to the input signal and the code output signal for producing a level-shifted input signal which is similar to the input signal but shifted (by clamping to the zero level) a value which the input signal assumes when the polarity of the code output varies from one to the other; and a low pass filter supplied with the level-shifted input signal. In another case in which the comparator is used in a feedback type pulse-code modulator or in a similar device, the comparator of the invention is further provided with a gate circuit for sampling the code output supplied thereto at the first bit position of every code word and the detecting circuit is composed in the manner explained heretofore depending upon whether the input signal has either the stochastic property of the above-mentioned first case or that of the above-described second case. Likewise, in still another case in which the comparator is used in a feedback-type pulse-code modulator or in a similar device and in which the mean values of the error signals are zero then the detecting circuit may simply be a low-pass filter supplied with the error signal which is the difference obtained by subtraction from the input signal of such an output signal as may be derived after decoding the code output at the local decoder.

A comparator of the invention can produce, by providing the detecting circuit with functions conforming to the stochastic property of the input signal, a code output in which the effect of the drift component is substantially completely removed. Inasmuch as it is only necessary for the detecting circuit to conform to the stochastic property of the input signal, it is also possible according to the invention, to reduce the variation of the direct-current component contained in the input signal. The variation superposed on such a residual drift component (which may vary linearly with the residual drift component present in the input signal) may be compensated for the drift component by feeding back (in the opposite polarity to the input signal) the amplified output obtained by amplifying the detected output. In the case where the positive root means square value of the input signal voltage (for a given time interval) is equal to the negative R.M.S. value of the input signal voltage, it is also possible to provide a comparator whose code output is substantially completely free from the effect of the drift component. Furthermore, inasmuch as the amplifier for amplifying the output of the detecting circuit may in general be formed to provide an amplified output having a functional relation to the input signal and the code output, it is also possible to provide a comparator whose code output is substantially perfectly free from the effect of the drift component. This is achieved by using a detecting circuit which is selected in accordance with which of various stochastic properties of the input signal and/or the code output, (for example the positive portion of the probability distribution of the magnitude of the input signal is symmetric with respect to the negative portion; the probability distribution curve is not symmetric but the mean magnitude of the input signal is zero; the remaining input signal left after the direct-current component has been removed from the input signal has any of the above-mentioned kinds of the property; each portion of the code output has equal absolute value but opposite polarities; and the code output assumes either a predetermined value or a zero value). According to the invention, it is also possible to stabilize a comparator whose on-off characteristic has hysteresis effects as is often the case.

In case the comparator of this invention is used in a pulse-code modulator or in a similar analogue-digital converter, the principles of the invention are applicable not only to the modulators or converters of the feedback type but also to counter-type modulators or converters as well as to delta-modulation encoders. As is known, a binary discriminator used in a regenerative-repeater for digital transmission is a device in which a sort of comparator is used to discriminate at every time point the state of the digital codes. The principles of the invention is also applicable to the binary discriminator whereby regeneration-repeating is possible with the effect of the drift component substantially completely removed.

As has been referred to, it is possible to aply this invention to a speech-to-zero-crossing-wave converter for converting the speech signal to a zero-crossing wave which is a rectangular wave varying from positive to negative values at zero points of the speech waveform and which can transmit the original speech with sufficient articulation. While it has hitherto been necessary (before detecting the zero points of the speech waveform by a comparator) to amplify the speech waveform up to high voltages in order to attain the desired precision with a comparator of the invention it has become possible to eliminate the need for high voltages and yet obtain a stable zero-crossing wave of the speech signal. This is acomplished because of the substantially complete compensation for the effect introduced into the code output by the drift of the working point.

In this invention in which use is made of the stochastic property of the remaining input signal left after the direct-current component has been removed from the input signal, it is not necessary to check up on the comparator as for example by using a specific pilot signal from time to time. Thus, it is seen that this invention is applicable to a wide field where discrimination of information is required.

The above-mentioned and other features and objects of this invention and the means of attaining them will become more apparent and the invention itself will be best understood by reference to the following description of embodiments of the invention taken in conjunction with the accompanying drawings in which.

Figures 1, 2, 3:
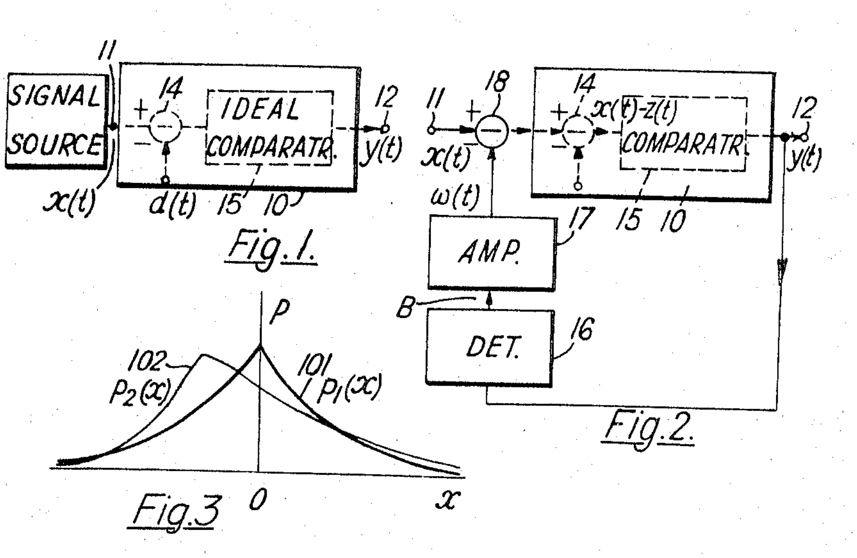
FIG. 1 is a block diagram of a general form of a comparator for use in explaining the principles of the invention.
FIG. 2 is a block diagram of a conventional comparator.
FIG. 3 shows some types of distribution of the magnitudes of the input signal for use in understanding the principles of the invention.

As shown in FIG. 1, a comparator 10 is connected to signal input source 100 at an input terminal 11 thereof which supplies an input signal $x(t)$ which is a function of the time $t$. Comparator 10 produces at output terminal 12 thereof a coded output $y(t)$ which assumes a predetermined voltage E (or a code of binary one) when the input signal $x(t)$ is larger than the working point of the comparator 10, (or a predetermined reference voltage V for the comparison) and another predetermined voltage E′ (or a code of binary zero) when the input signal $x(t)$ is smaller than the working point V. This may be accomplished by a Schmitt circuit or other circuit described in the preamble of the specification. The working point V which is determined by the construction and the constants of the comparator 10 and by the source voltage for setting the comparator 10 into operation, can be set at zero by adjusting the source bias voltages. Therefore, it will now be assumed that the working point V of the comparator 10 is zero and that the input signal $x(t)$ has no direct-current component.

As has been mentioned in the preamble of the specification, the working point of a comparator will experience drift during operation. When the drift of the zero working point is $d(t)$, the comparator compares (in equivalency) the remainder left after the drift component $d(t)$ is subtracted from the input signal $x(t)$, with the fixed working point or the reference voltage of zero. Consequently, it is possible to presume, as shown in FIG. 1 with dashed lines, that the comparator 10 consists of an imaginary subtracting circuit 14 (for subtracting the drift component $d(t)$ from the input signal $x(t)$) and an ideal comparator 15 having a zero working point in which the drift component $d(t)$ never appears. The ideal comparator 15 produces at the output terminal 12 a coded output $y(t)$ whose voltage is E when the ideal-comparator input signal $x(t)-d(t)$ is larger than the working point O and whose voltage is E′ when the ideal-comparator input signal $x(t)-d(t)$ is smaller than the working point O.

Referring to FIG. 2, there is illustrated one conventional comparator for use when the positive portion of the probability distribution of the magnitude of the input signal $x(t)$ is symmetric with respect to the negative portion. Consequently, in this case, the input signal $x(t)$ has no direct-current component. The comparator of FIG. 2 has an input terminal 11 for receiving the input signal $x(t)$ from source 100 (not shown in this embodiment). The comparator 10 as explained with reference to FIG. 1 has an output terminal 12. A detecting circuit 16 is provided for detecting the effect, if any, caused by a residual drift component $z(t)$ in the coded output $y(t)$ derived at the output terminal 12. The amplifier 17 is provided for amplifying the detected output of the detecting circuit 16, and a subtracting circuit 18 is interposed between the input terminal 11 and the comparator 10 to subtract from the input signal $x(t)$ the amplified output $w(t)$ of the amplifier 17, (or the amplifier effect caused by the residual drift component). Assuming that the comparator 10 consists of an imaginary subtracting circuit 14 and an ideal comparator 15, the ideal comparator 15 of FIG. 2 will thus be supplied with an ideal-comparator input signal.

$$\left.\begin{array}{c} x(t)=(w(t)+d(t) \\ \text{and the residual drift component is given by} \\ z(t)=w(t)-d(t) \end{array}\right\} \quad (1)$$

Figures 4A, 4B:
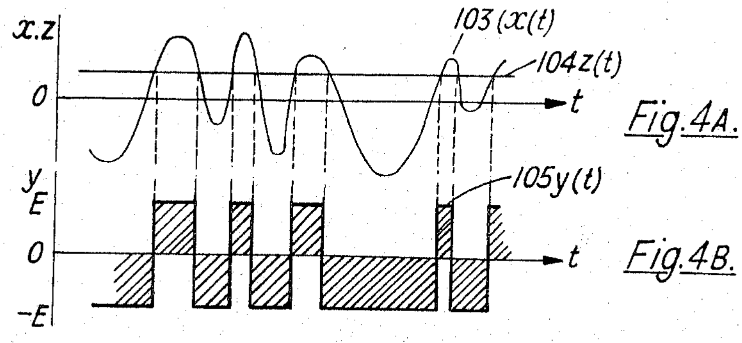
FIGS. 4A and 4B show waveforms of the input signal and the code output respectively, which are utilized to further explain the invention.

Referring now to FIGS. 3 and 4, which illustrate probability distribution curves for the input signal, the case where the positive portion is symmetric with respect to its negative portion is illustrated by a thick curve 101 $p_1(t)$ shown in FIG. 3. In FIG. 3 the abscissa indicates the magnitude $x$ of the input signal $x(t)$ (which is positive to the right of the zero axis and negative to the left of the zero axis) and the ordinate shows the probability $p$ of the event such that the input signal $x(t)$ may assume a given magnitude $x$. Now, however, let us assume that the waveform of the input signal $x(t)$ is given by the curve 103 in FIG. 4A. (In FIG. 4A the abscissa represents the time $t$ and the ordinate axis represents the magnitude.) In FIG. 4A the input signal $x(t)$ and the residual drift component $x(t)$ are shown on the same scale. Inasmuch as the residual drift component $z(t)$ varies very slowly with time, it may be illustrated by the curve 104 in FIG. 4A. In the case under consideration, the code output $y(t)$ (curve 105) is assumed to have two values E and E′ which are respectively transformed into E and −E, (FIG. 4B on the abscissa axis plots the time $t$ on the same scale as in FIG. 4A and the ordinate axis shows the value $y$ of the coded output). The mean value B of the code output $y(t)$ (curve 105 of FIG. 4B) taken over a sufficiently long time interval (or the algebraic sum of the areas enclosed by the coded output $y(t)$ and the $t$-axis and which have the plus and the minus values) is linearly proportional to the remainder left after the probability for the input signal $x(t)$ (whose probability distribution curve is represented by the curve $p_1(x)$ in FIG. 3 and which is smaller than the residual drift component $z(t)$ is subtracted from $z(t)$ such that the former probability is larger than the latter probability. Therefore, $$B=E\cdot\int_{z(t)}^{\infty}p_1(x)\cdot dx-E\cdot\int_{-\infty}^{z(t)}p_1(x)\cdot dx \qquad (2)$$

where $$\int_{-\infty}^{z(t)}p_1(x)\cdot dx=\int_{-z(t)}^{\infty}{}_{-1}(x)\cdot dx \qquad (3)$$

because the positive portion of the probability distribution $p_1(x)$ is symmetric with respect to the negative portion. From the Equations 2 and 3, $$B=E\cdot\int_{z(t)}^{-z(t)}p_1(x)\cdot dx$$

or $$B=-2E\cdot\int_{0}^{z(t)}p_1(x)\cdot dx \qquad (4)$$

follows:

If the probability density $p_1(x)$ is specifically a negative exponential distribution so that $$p_1(x)=(L/2)\cdot\exp(-L|x|) \qquad (5)$$

(where L is $\sqrt{2}$ times the inverse of the root means square voltage or current of the input signal $x(t)$ because the probability density $p_1(x)$ is given by the Equation 5 when the mean power of the input signal $x(t)$ is given by $2/L^2$.) Then, from the Equation 4

$$B=LE\cdot\int_{0}^{z(t)}\exp(-Lx)\cdot dx$$

or it follows that $$B=E[1-\exp(-L\cdot z(t))] \qquad (6)$$

It should be noted here that the residual drift component $z(t)$ which is left after the drift component $d(t)$ has been compensated for by the amplified output $w(t)$ is small enough (when compared with the mean value $\sqrt{2}/L$ of the effective value of the voltage or current of the input signal $x(t)$ taken over a long time interval) and consequently the absolute value of the argument of the exponential function in the Equation 6 is sufficiently smaller than unity. Therefore, by expanding the exponential function into a Maclaurin's series, it follows that $$B=-LE.z(t) \qquad (7)$$

(Incidentally, it is well-known that the stochastic average value which has been dealt with herein may be given, if the input signal is ergodic, by the time average taken over a sufficiently long period and that the input signal may very frequently be considered ergodic when it is a multiplexed signal.)

Returning to FIG. 2, the comparator is so arranged that the detecting circuit 16 produces, as the detected output, the mean value B of the coded output $y(t)$ taken over a sufficiently long time interval. Such a detecting circuit 16 is realizable by a low-pass filter. The detected output is amplified at the amplifier 17 to become an amplified output $w(t)$, which is given by $$w(t)=-G.z(t) \qquad (8)$$

where −G is the product of the coefficient −LE in the right-hand side of the Equation 7 and the gain of the amplifier 17. Thus, the residual drift component $z(t)$ is as follows (from Equation 1):

$$z(t)=d(t)/(1+G) \qquad (9)$$

This equation shows that the residual drift component $z(t)$ of the comparator illustrated in FIG. 2 is reduced to $1/(1+G)$ of the drift component $d(t)$ of the conventional comparator 10 and that it decreases with increases in the gain of the amplifier 17.

Figures 5A, 5B:
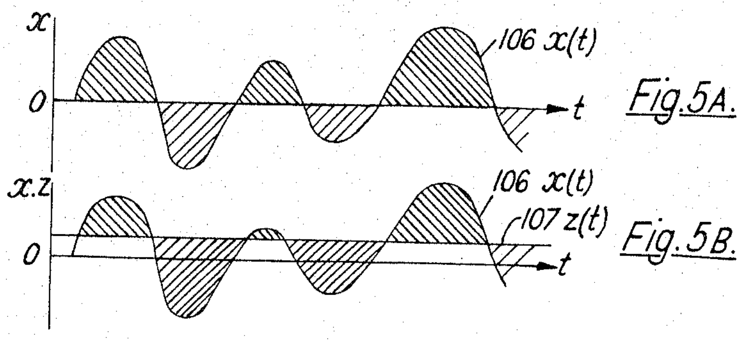
FIGS. 5A and 5B show waveforms of the input signal applied to the device of the invention.

Again referring to FIG. 3 and simultaneously referring to FIG. 5 another case will now be considered wherein as shown in FIG. 3 by curve 102, $p_2(x)$, the probability distribution of the magnitude $x$ of the input signal $x(t)$ is assymmetrical while the input signal $x(t)$ has no direct-current component (or the area below the distribution curve $p_2(x)$ for positive value of the input signal $x(t)$ is equal to the area below the distribution curve $p_2(x)$ for negative value of the input signal $x(t)$). A typical input of this type is the speech signal. As shown in FIG. 5A, which illustrates the waveform 106 of an input signal $x(t)$ (wherein the time $t$ is plotted along the abscissa and the magnitude $x$ of the input signal $x(t)$ is plotted along the ordinate,) the areas enclosed by the axis of abscissas and the waveform of the input signal $x(t)$ above the axis, (or the mean value of the positive values of the input signal $x(t)$ taken over a sufficiently long time interval) is equal to the means value of the negative values of the input signal $x(t)$. From the previous description of FIG. 2, it will be appreciated that if the ideal-comparator input signal of the ideal comparator 15 has a residual drift component $z(t)$, the ideal comparator 15 performs the comparison for the input signal $x(t)$ with the working point set not at zero but at $z(t)$ (curve 107) as illustrated in FIG. 5B wherein the abscissa shows the time $t$ and the ordinate shows the magitudes. In FIG. 5B the input signal $x(t)$ (106) and the residual drift component $z(t)$ (107) are both plotted on the same scales as in FIG. 5A. Therefore, the sum of the mean value of the positive values $x(t)-z(t)_1$ (denoted as $A_1$) of the ideal comparator input signal taken over a sufficiently long time interval and the mean value of the negative values $x(t)-z(t)_2$ (denoted as $A_2$ also taken over a sufficiently long period is given by $$A_1'+A_2'=\overline{x(t)}-\overline{z(t)}$$

where $\overline{x(t)}$ and $\overline{z(t)}$ with a bar thereover represent the mean values, respectively. If the mean values are calculated for a time interval which is long enough for the variation of $x(t)$ but short enough for the variation of $z(t)$, then $$\overline{z(t)}=0 \text{ and } \overline{z(t)}=z(t)$$

with the result that $$A_1'+A_2'=-z(t) \qquad (10)$$

which shows that the above-mentioned sum gives a quantity related to the residual drift component $z(t)$.

Figures 6, 7, 8:
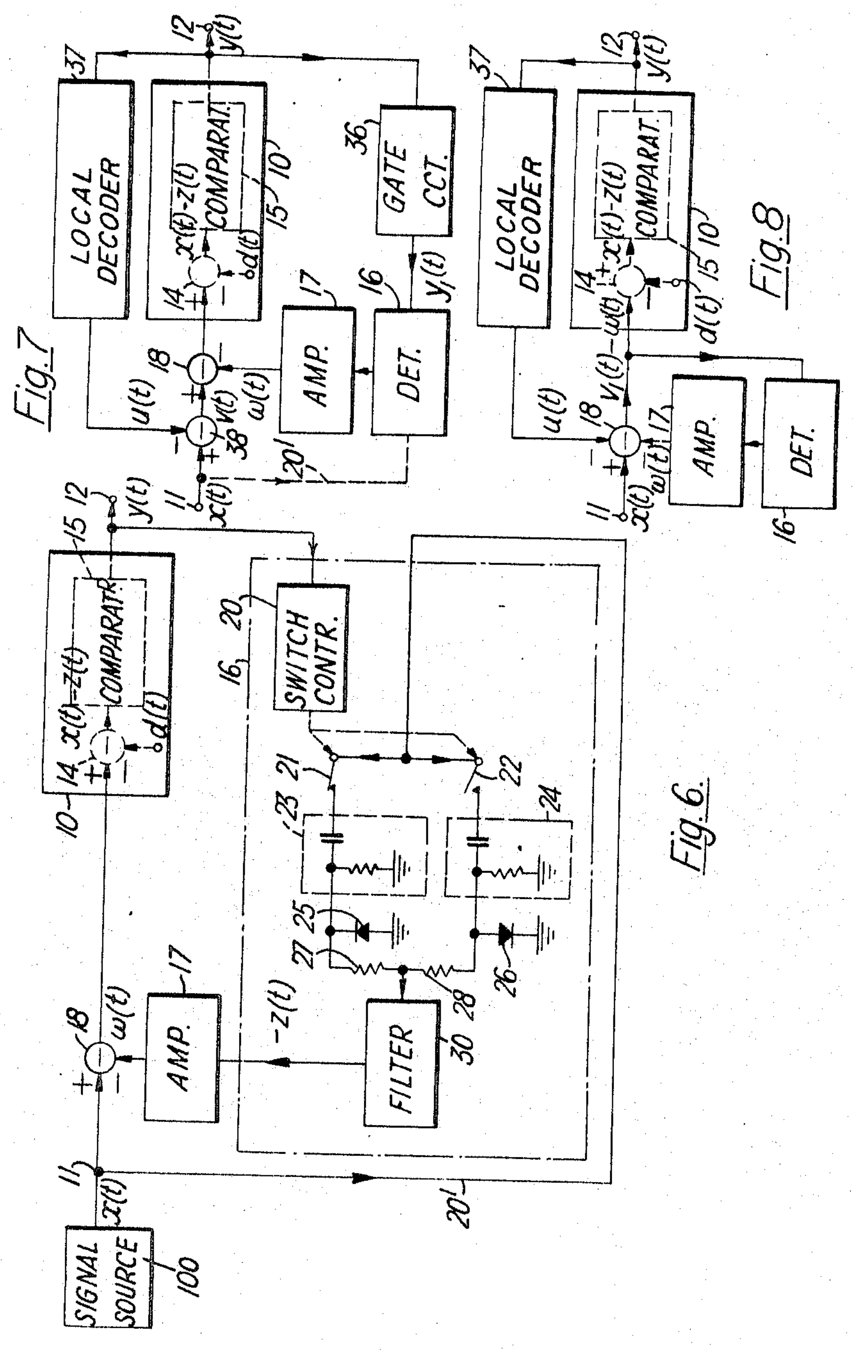
FIG. 6 is a circuit diagram, partly shown in blocks, of an embodiment of the invention.
FIG. 7 is a block diagram of another embodiment of the invention.
FIG. 8 is a block diagram of a further embodiment of the invention.

Referring now to FIG. 6, an embodiment of the invention is illustrated which is adapted to the case wherein the probability distribution of the input signal $x(t)$ is assymmetrical while the input signal $x(t)$ has no direct-current component. In FIG. 6, the input terminal 11 is connected to receive the input signal $x(t)$ from source 100. The comparator 10 is similar to the one explained with reference to FIG. 1. Output terminal 12 is provided for the comparator 10. The detecting circuit 16 is provided for detecting the effect, if any, introduced by the residual drift component $z(t)$ into the code output $y(t)$ delivered to the output terminal 12. The amplifier 17 is provided for amplifying the detected output of the detecting circuit 16, and a subtracting circuit 18 is interposed between the input terminal 11 and the comparator 10 for subtracting from the input signal $x(t)$ the amplified output of the amplifier 17 or the detected and then amplified output $w(t)$. The detecting circuit 16 comprises: a switch controlling device 20 for complementarily making and breaking a pair of switches 21 and 22 depending on whether the code output $y(t)$ is positive or negative or depending on whether the input signal $x(t)$ is above or below the curve illustrating the residual drift component $z(t)$ in FIG. 5B. Detector 16 also includes a pair of alternating-current coupling circuits 23 and 24, preferably composed of capacitors and resistors having the same circuit constants. The input signal $x(t)$ is transmitted from the input terminal 11 through lead 20' and through one of the closed switches 21 or 22 to circuits 23 and 24. A diode 25 is provided for clamping the varying voltage obtained at the output side of the alternating-current coupling circuits 23 to a reference potential, such as the earth, so that those portions of the varying voltage which correspond to such portions of the input signal $x(t)$ as may be above the curve illustrating the residual drift component $z(t)$ in FIG. 5B, may not go below the reference potential. Another diode 26 is provided for circuit 24 for transforming those portions of the varying voltage which correspond to such portions of the input signal $x(t)$ in as may be below the curve illustrating the residual drift component $z(t)$ in FIG. 5B, to a voltage which never goes above the reference potential.

The combination of the switching controlling device 20, switches 21 and 22, alternating-current coupling circuits 23 and 24, and diodes 25 and 26 may be called an extraction circuit, because these elements cooperatively extract the successive instantaneous values of the input signal in response to the coded output $(y)t$. Resistors 27 and 28 are provided for summing, from time to time, the clamped voltages obtained at the ungrounded electrodes of the diodes 25 and 26. A low-pass filter 30 is provided for deriving as the detected output a quantity $-z(t)$ determined in accordance with Equation 10 by performing an averaging operation upon the summed up voltages or upon the portion of the input signal $x(t)$ which has been biased by the residual drift component $z(t)$ or upon that voltage which may be represented, in FIG. 5B, by the input signal $x(t)$ when the absciassa axis is shifted to conform to the curve illustrating the residual drift component $z(t)$. As in the example shown in FIG. 2, the amplifier 17 amplifies the detected output $-z(t)$ to derive an amplified output $w(t)$ which can be expressed by:

$$w(t)=-G.z(t)$$

and used to reduce the residual shift component $z(t)$ to $$z(t)=d(t)/(1+G)$$

The switch controlling device 20 and the accompanying switches 21 and 22 may be those illustrated in FIG. 5, my copending application entitled "Non-Linear Decoder" Ser. No. 314,765, filed Oct. 8, 1963.

Referring to FIG. 7, there is illustrated therein a feedback-type analogue-digital converter or pulse-code modulator. The device of FIG. 7 comprises: an input terminal 11 for receiving the input analogue signal $x(t)$ for example, from a source 100 (not shown). The comparator 10 is similar to the one explained with reference to FIG. 1. The output terminal 12 is provided for the comparator 10. A gate circuit 36 is provided for gating (in a manner to be explained hereinafter) the digital output or the coded output $y(t)$ obtained at the output terminal 12. The detecting circuit 16 is provided for detecting from the output of the gate circuit 36 the effect, if any, introduced by the residual drift component $z(t)$ into the code output $y(t)$. The amplifier 17 amplifies the detected output of the detecting circuit 16. A local decoder 37 is provided for decoding the code output $y(t)$. The input altering subtracting circuit 38 and a compensating subtracting circuit 18 are both interposed between the input terminal 11 and the comparator 10 and are adapted to subtract from the input analogue signal $x(t)$ the decoded analogue signal $u(t)$ obtained as the decoded output of the local decoder 37 to derive a difference analogue signal $v(t)$ and to subtract from the difference analogue signal $v(t)$ the amplified output $w(t)$ of the amplifier 17, respectively.

The main portions of the feedback-type analogue-digital converter of FIG. 7 are the comparator 10, the local decoder 37, and the input altering subtracting circuit 38. Such a converter operates in the manner described in "Coding by Feedback Methods" by B. D. Smith in Proceedings of the I.R.E. 1953, pp. 1053–1058 (August). The converter compares at a first time point the input analogue signal $x(t)$ with the working point 0 of the comparator 10 to deliver to the output terminal 12 as the digit coded output $y_1(t)$ of the most significant digit, the result of the comparison which represents whether the input analogue signal $x(t)$ is positive or negative. The converter subtracts from the input analogue signal $x(t)$ at the input altering subtracting circuit 38 the decoded output $u_1(t)$ which has been obtained by decoding the quantized code output $y_1(t)$ so as to enable comparison of the input analogue signal $x(t)$ with the reference analogue signal $u_1(t)$. Said converter also compares at a second time point, the difference analogue signal $v_1(t)$ with the working point 0 of the comparator 10 to deliver to the output terminal 12 as the coded output $y_2(t)$ of the second-digit digit code the result of the comparison which represents whether the difference analogue signal $v_1(t)$ is positive or negative or whether the input analogue signal $x(t)$ is greater or smaller than the reference analogue signal $u_1(t)$. The first, the second, and the succeeding time points are determined, (although not shown in FIG. 7), by supplying timing pulses to the local decoder 37 and the like. In order to compensate for the drift $d(t)$ of the comparator 10 to minimize the residual drift component $z(t)$, use has been made in the embodiments explained with reference to FIGS. 2 and 6, of the coded output $y(t)$ obtained as a result which represents whether the input signal $x(t)$ is positive or negative. It is therefore to be noted that in the feedback-type analogue-digital converter, the code outputs $y_2(t)$, etc. obtained at the second and the succeeding time points do not serve to reduce the residual drift component $z(t)$. Consequently, the gate circuit 36 which is opened by the timing pulses at the first time point is provided to send only the code output $y_1(t)$ of the first time point to the detecting circuit 16. The construction of FIG. 7 thus far explained is sufficient when the distribution of the input analogue signal $x(t)$ is symmetrical with respect to the line which represents zero magnitude. If the input analogue signal $x(t)$ has asymmetrical distribution of the magnitudes and also has no direct-current component, then a connection 20' shown in FIG. 7 by a dashed line is necessary to supply the input analogue signal $x(t)$ to the detecting circuit 16 in the manner described with reference to FIG. 6. Incidentally, the input altering and the compensating subtracting circuits 38 and 18 may be replaced with a combined subtracting circuit, which is supplied with the decoded analogue signal $u(t)$ and the amplified output $w(t)$.

Referring to FIG. 8, there is illustrated another embodiment of this invention which is particularly adapted for use as an analogue to digital feedback type converter. In FIG. 8 an analogue input signal is applied to terminal 11 of the forward transmission path which includes comparator 10 and output terminal 12. The local decoder 37 is provided in a first feedback loop connected from the output terminal to the subtraction circuit 18. The decoder is for the digital output signals of the comparator 10. In FIG. 8 a second feedback loop is provided which feeds a portion of the input signals to the comparator 10 back to subtraction circuit 17. In FIG. 8 the analogue input signal $x(t)$ is converted to the output signal $y(t)$. The difference analogue voltage $v_1(t)$ is obtained by subtracting the partially encoded digital signals from the input signals. The output of the second feedback loop $w(t)$ is subtracted from $v_1(t)$ and thus the signal supplied to the comparator 10 is $v_1(t)-w(t)$. The signal $$v_1(t)-w(t)$$

is then again supplied to the second feedback loop through detecting circuit 16 and the amplifier 17 back to the compensating subtracting circuit 18 in the opposite polarity. Detector 16 is a low-pass filter. The magnitude of the error signals $v_1(t)$ is distributed symmetrically with respect to zero. The detecting circuit 16 may have the construction disclosed with reference to FIG. 6 with the addition of a connection 20' described with reference to FIGS. 6 and 7 and the error signals $v_1(t)$ are of asymmetrical distribution. Incidentally, the compensating subtracting circuit 18 in the converter shown in FIG. 8 also serves to subtract the decoded analogue signal $u(t)$ from the input analogue signal $x(t)$. Also, it will be appreciated that in this converter the effect introduced by the drift into the code output $y(t)$ is detected indirectly from the error signal $v_1(t)$.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A signal comparator comprising:

(A) a source of time varying signals in which the mean value of the input signal over an interval greater than the frequency of said input signal has a value which is substantially variable with time;

(B) a forward transmission path having:

(1) an input terminal connected to said signal source, (2) an output terminal, (3) comparison means connected between said terminals for comparing a predetermined characteristic of the input signals with a similar characteristic of a preselected working point for said comparison means, (a) said comparison means producing comparison output signals having a first value when the working point characteristic is smaller than the input characteristic and a second value when said working characteristic is larger than said input characteristic, (4) and combining means connected between said input terminal and said comparison means;

(C) feedback means connected to feed a portion of the signals in said forward path back to said combining means, said combining means combining the feedback signals with the input signals to reduce the drift component in said input signals, said feedback means including:

(1) detection means for detecting the drift and the direction of drift of the working point and for generating detection output signals in response to the thus detected drift, said detection means including: an extraction circuit, means for connecting the input signal source to said extracting circuit along with the portion of the comparison output signals being fed back, said extracting circuit producing a positive value output when the first comparison output signal is fed back thereto and producing a negative value output when the second comparison output is fed back thereto, a summing circuit for summing said positive and negative output values of the extracting circuit and a low pass filter for producing the detection output signals in response to the sum of said outputs, said last mentioned connecting means comprising a switch controlling device responsive to the output of said comparison means; and a pair of switches controlled by said device for the complementary making and breaking dependent upon the said comparison signal, (2) amplification means for amplifying the detection output signals whereby the drift of the working point of said comparison means is minimized.

2. The signal comparator set forth in claim 1 in which said extracting circuit further comprises: a pair of A.C. coupling circuits respectively coupled to said switches; and a pair of clamping circuits respectively coupled to said A.C. coupling circuits for restricting the respective voltages from said coupling circuits.

3. The signal comparator set forth in claim 2 in which said summing circuit includes a pair of resistors respectively coupled to said clamping means; and in which said filter is coupled to the other end of each of said resistors.

References Cited

UNITED STATES PATENTS

| | | | |
|---|---|---|---|
| 2,845,597 | 7/1958 | Perkins | 324—103 |
| 3,070,786 | 12/1962 | MacIntyre | 340—347 |
| 3,148,366 | 9/1964 | Schulz | 340—347 |

MAYNARD R. WILBUR, *Primary Examiner.*

A. L. NEWMAN, W. J. KOPACZ, *Assistant Examiners.*